US009551883B2

(12) United States Patent
Legerton

(10) Patent No.: US 9,551,883 B2
(45) Date of Patent: *Jan. 24, 2017

(54) CONTACT LENS FOR KERATOCONUS

(71) Applicant: VICOH, LLC, San Diego, CA (US)

(72) Inventor: Jerome A. Legerton, Jupiter, FL (US)

(73) Assignee: VICOH, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,271

(22) Filed: Dec. 9, 2014

(65) Prior Publication Data

US 2015/0092154 A1 Apr. 2, 2015

Related U.S. Application Data

(63) Continuation of application No. 13/304,246, filed on Nov. 23, 2011, now Pat. No. 8,936,362, which is a continuation of application No. 12/324,569, filed on Nov. 26, 2008, now Pat. No. 8,083,346.

(51) Int. Cl.
*G02C 7/02* (2006.01)
*G02C 7/04* (2006.01)

(52) U.S. Cl.
CPC .......... *G02C 7/047* (2013.01); *G02C 7/04* (2013.01); *G02C 7/049* (2013.01); *G02C 2202/04* (2013.01)

(58) Field of Classification Search
CPC ............. G02C 7/047; G02C 7/04; G02C 7/02
USPC ........... 351/159.01, 159.23, 159.73, 159.74, 351/159.78
See application file for complete search history.

(56) References Cited

U.S. PATENT DOCUMENTS

| | | | |
|---|---|---|---|
| 3,227,507 A | 1/1966 | Feinbloom | |
| 3,482,906 A | 12/1969 | Volk | |
| 3,684,357 A | 8/1972 | Tsuetaki | |
| 3,973,837 A | 8/1976 | Page | |
| 3,973,838 A | 8/1976 | Page | |
| 4,194,815 A | 3/1980 | Trombley | |
| 4,208,362 A | 6/1980 | Deichert et al. | |
| 4,943,150 A | 7/1990 | Deichert et al. | |
| 5,450,145 A | 9/1995 | Valentine | |
| 5,570,142 A * | 10/1996 | Lieberman | 351/159.02 |
| 5,790,235 A | 8/1998 | Kirschbaum | |
| 5,880,809 A | 3/1999 | Lieberman et al. | |
| 6,241,355 B1 | 6/2001 | Barsky | |
| 6,491,393 B1 | 12/2002 | Appleton | |
| 7,431,455 B2 | 10/2008 | Chernyak | |
| 7,891,810 B2 | 2/2011 | Legerton | |
| 8,083,346 B2 | 12/2011 | Legerton | |

(Continued)

FOREIGN PATENT DOCUMENTS

DE 3817334 A1 * 11/1989
EP 0 445 994 9/1991

*Primary Examiner* — James Greece
(74) *Attorney, Agent, or Firm* — Sheppard, Mullin, Richter & Hampton LLP

(57) ABSTRACT

The present invention is directed to a non-deforming contact lens for keratoconus patients having a displaced central zone. In particular, the central zone is displaced from the geometric center of the lens. The shape of the central zone is egg or spoon-shaped and is rotationally asymmetrical with one semi-meridian that is shorter than a corresponding semi-meridian. An intermediate transition zone is formed integral with the periphery of the central zone, and a peripheral zone is formed integral with the periphery of the intermediate transition zone, forming a round contact lens.

20 Claims, 3 Drawing Sheets

(56) References Cited

U.S. PATENT DOCUMENTS

| | | |
|---|---|---|
| 2002/0093623 A1 | 7/2002 | Duppstadt |
| 2005/0203619 A1 | 9/2005 | Altmann |
| 2005/0280777 A1 | 12/2005 | Dai |
| 2006/0023162 A1 | 2/2006 | Azar et al. |
| 2006/0274263 A1 | 12/2006 | Yacktman et al. |
| 2007/0091259 A1 | 4/2007 | Svochak |
| 2007/0291224 A1 | 12/2007 | Lai |
| 2008/0007694 A1 | 1/2008 | Wei et al. |
| 2008/0013043 A1 | 1/2008 | Ye et al. |
| 2008/0100612 A1 | 5/2008 | Dastmalchi et al. |
| 2008/0212020 A1 | 9/2008 | Legerton et al. |
| 2010/0110382 A1 | 5/2010 | Legerton |
| 2010/0328603 A1 | 12/2010 | Liguori et al. |
| 2011/0228213 A1 | 9/2011 | Legerton |

* cited by examiner

CONTACT LENS FOR KERATOCONUS

REFERENCE TO RELATED APPLICATIONS

This application is a continuation of U.S. patent application Ser. No. 13/304,246 filed Nov. 23, 2011, which is a continuation of U.S. patent application Ser. No. 12/324,569 filed Nov. 26, 2008, the contents of which are incorporated by reference in their entireties.

FIELD OF THE INVENTION

The present invention relates generally to contact lenses and ophthalmic methods. More particularly, the present invention relates to devices and methods for contact lenses for fitting patients with keratoconus.

BACKGROUND OF THE INVENTION

Humans see through the cornea, the clear central part of the front surface of the eye. Normally the cornea is dome shaped. Sometimes, however, the structure of the cornea is not strong enough to hold the dome shape and bulges outward in a cone shape. When this occurs, the condition is called keratoconus. Keratoconus is a progressive disease characterized by a thinning of the cornea with concomitant change in the shape of the corneal surface with resultant manifestation of irregular astigmatism and reduced best spectacle corrected visual acuity. The progressive thinning frequently results in severe ectasia, corneal scarring, and visual compromise that requires penetrating keratoplasty to restore vision.

The cause of keratoconus is unknown. It may run in families and does occur more often in people with certain medical problems, including certain allergic conditions. Keratoconus usually begins in the teenage years, but can begin as late as age thirty. Changes in the shape of the cornea occur gradually, often over several years. Over time, the patient's vision slowly becomes distorted. Both eyes are eventually affected, even though at first only one eye may be affected. The extent of change may vary between the eyes. Diagnosis is made using corneal measurements.

A new spectacle can make vision clear in mild cases of keratoconus. Eventually it will probably be necessary to use contact lenses to make vision clear. Typically, rigid contact lenses are used. Contact lenses manufactured for keratoconus have used posterior designs that are geometrically centered in the lens. In the majority of keratoconus cases the apex of the ectatic cornea is not centered, rather, it is displaced, or off-center. Because of this, lenses designed to conform to the shape of the cornea displace in the direction of the apex displacement as the lenses attempt to fit the underlying cornea. Rigid contact lenses are frequently used to provide a uniform optical surface and normal best corrected visual acuity. At the same time, lens intolerance or scarring may occur with these lenses. Hybrid (rigid center—hydrogel skirt) lenses have been suggested as an ideal means of providing the benefits of rigid lenses for correction of the irregular astigmatism by way of the tear lens while providing the comfort and stability of soft lenses.

Recent animal research with lenses designed for purposeful corneal reshaping and corneal refractive therapy demonstrate the potential to increase the thickness of the epithelium with lenses that vault a portion of the cornea. These studies explain the clinical phenomena of correcting hyperopia by applying an lens having a radius of curvature greater than that of the underlying cornea.

There is no evidence in the literature that any contact lens design strategy has been useful in correcting keratoconus by therapeutically increasing the thickness of the epithelium or the underlying cornea by vaulting the cornea. Such a strategy would be difficult with conventional rigid gas permeable or hydrogel contact lenses. The preferred fitting method for rigid gas permeable lenses has been a three point of feather touch of the lens where the lens makes direct contact with the apex or thinnest portion of the cornea in an eye with keratoconus. In hydrogel lenses, the lens often drapes the cornea and makes contact with the majority of its surface.

Attempts have been made to use corneal topography to create a lens that matches the shape of the patient's cornea. In cases or moderate to severe ectasia, these measurements are not reliable and lenses made using these measurements have been known to cause discomfort. The discomfort in turn causes the patient to discontinue wearing the lenses. In addition, corneal topography is approximately limited to the central nine millimeters of the cornea. A well-fitted contact lens for keratoconus must cover a larger area, preferably an area that extends beyond the diameter of the cornea.

Soper, McGuire and Rose K lenses have been commonly used in treating keratoconus patients. These lenses are rigid corneal lenses that are small in diameter, rotationally symmetrical, and use multiple concentric spherical curves. The lenses displace in the direction of the apex of the underlying cornea and provide limited visual acuity due to the residual low order astigmatism and higher order aberrations. Furthermore, the lenses are time consuming to fit and provide limited comfort, wearing time, and vision.

Another design used in keratoconus patients is the Quadra design. This design is a rigid corneal lens with a central apex having different eccentricities in the four quadrants of the posterior surface of the lens. The different eccentricities in the four quadrants accommodate the difference in sagittal height of the ectatic cornea. The Quadra design fits the cornea more closely than lenses using concentric spherical curves. Unfortunately, the Quadra lens also displaces toward the apex of the cornea and provides limited visual acuity and comfort.

Softperm and SynergEyes KC are hybrid contact lenses having spherical and elliptical concentric designs, respectively. The hybrid lenses have a rigid gas permeable center and a soft hydrogel skirt. They are fitted with a central or apical radius shorter than the underlying eye and are designed to vault the apex of the cornea. The hydrogel skirt provides better comfort than purely rigid contact lenses, but still causes discomfort and may exhibit flexure with resulting residual low and higher order aberrations on eyes with moderate to severe ectasia.

The Boston Scleral Lens is a rigid gas permeable lens that is custom fitted. The lens has a central portion that vaults the ectatic cornea. The mid-peripheral and peripheral portion of the lens align the corneal-scleral junction and sclera. This lens design does not displace toward the corneal apex. Fewer residual low and higher order aberrations are found in this scleral lens-eye system, but fitting is quite complex and expensive, leading to limited use of the design. A further drawback is that the lenses are difficult to apply and remove and have been found to be less comfortable than hybrid and soft contact lenses.

The Roffman lens is a hybrid multifocal contact lens incorporating both soft lens material and a rigid lens material. The rigid lens material is wholly contained within the soft lens material. At least one portion of the lens, preferably the front surface, has a multifocal optical zone. The multifocal zone may be a progressive power zone or may contain three to five concentric zones. A drawback to the Roffman lens is that is does not treat keratoconus and as a result would be likely to displace in the direction of the apex of the underlying cornea.

The conventional fitting method for rigid gas permeable lenses is a three point of feather touch of the lens where the lens makes direct contact with the apex or thinnest portion of the cornea in an eye with keratoconus. In hydrogel lenses the lens often drapes the cornea and makes contact with the majority of its surface. In many cases, these lenses are not comfortable for the patient, with the result that the lenses are not worn.

SUMMARY OF THE INVENTION

In view of the above-identified drawbacks, the present invention provides a design-based system of fitting the keratoconic cornea that respects the displacement of the apex of the cornea and does not rely on corneal topography to generate a posterior surface lens design. In addition, the invention involves a lens for keratoconus patients that provides increased comfort and improved visual acuity. Furthermore, the invention provides a kit of lenses having posterior surfaces with a displaced central zone for the correction of keratoconus, where the series of zones provide a range of curvatures and zone diameters and the anterior surfaces creates lens powers respective to the posterior zone radii.

According to an embodiment of the present invention, a contact lens for keratoconus is provided. The lens is designed to accommodate the displaced apex of the cornea in keratoconus. This central zone of the lens is displaced from a geometric center of the lens. The central zone has an oval curvature, being egg- or spoon-shaped. This central zone is rotationally asymmetrical with one semi-meridian being shorter than a corresponding semi-meridian. An intermediate transition zone is disposed outside the central zone of the lens. In turn, this intermediate transition zone terminates in a peripheral zone. The peripheral zone terminates at the lens edge, providing a round contact lens.

An additional embodiment provides a kit of contact lenses for fitting patients with keratoconus. The kit includes at least two contact lenses for keratoconus. Both sets of contact lenses have posterior surfaces with displaced central zones. Each central zone provides a range of curvatures and zone diameters. The anterior surfaces create contact lens powers respective to their posterior zone radii.

The invention also provides a method of fitting a contact lens for keratoconus. The method includes the step of determining a central keratometry measurement. This central keratometry measurement is used to determine an apical radius of the contact lens for keratoconus. In addition, the central keratometry measurement is used to determine the amount of displacement of the apex of the patient's cornea. These measurements are used to determine an anterior surface geometry using known biometric values.

An additional embodiment provides for another method of fitting a contact lens for keratoconus. The embodiment involves determining a central keratometry measurement and also measuring a horizontal iris diameter. The sagittal height of the cornea from a cornea-sclera junction to an apex of the cornea using the central keratometry measurement and the horizontal visible iris diameter. A further step in the method involves determining an amount of the displacement of the apex of the cornea.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

As set forth hereinabove, prior art contact lenses for keratoconus used posterior designs that were geometrically centered on the contact lens. However, in the majority of cases of keratoconus, the apex of the cornea is not centered, rather, it is displaced from the center. Lenses conforming to the shape of the cornea are displaced in the direction of the apex of the cornea.

Corneal topography has been used in attempts to create lenses to precisely match the shape of the underlying cornea. For moderate to severe ectasia, the measurements are not reliable and lenses produced using the measurements are uncomfortable to wear, especially for long periods. This discomfort causes patients to discontinue wearing the lenses. In addition, corneal topography is limited to measuring the central nine millimeters of the cornea, not enough to ensure a well-fitting lens. Further, gravity and lid interaction forces cause the lens that is intended to match the corneal surface to misalign with resultant unanticipated aberrations and reduced visual acuity.

A. Devices of the Present Invention

Figure 1:
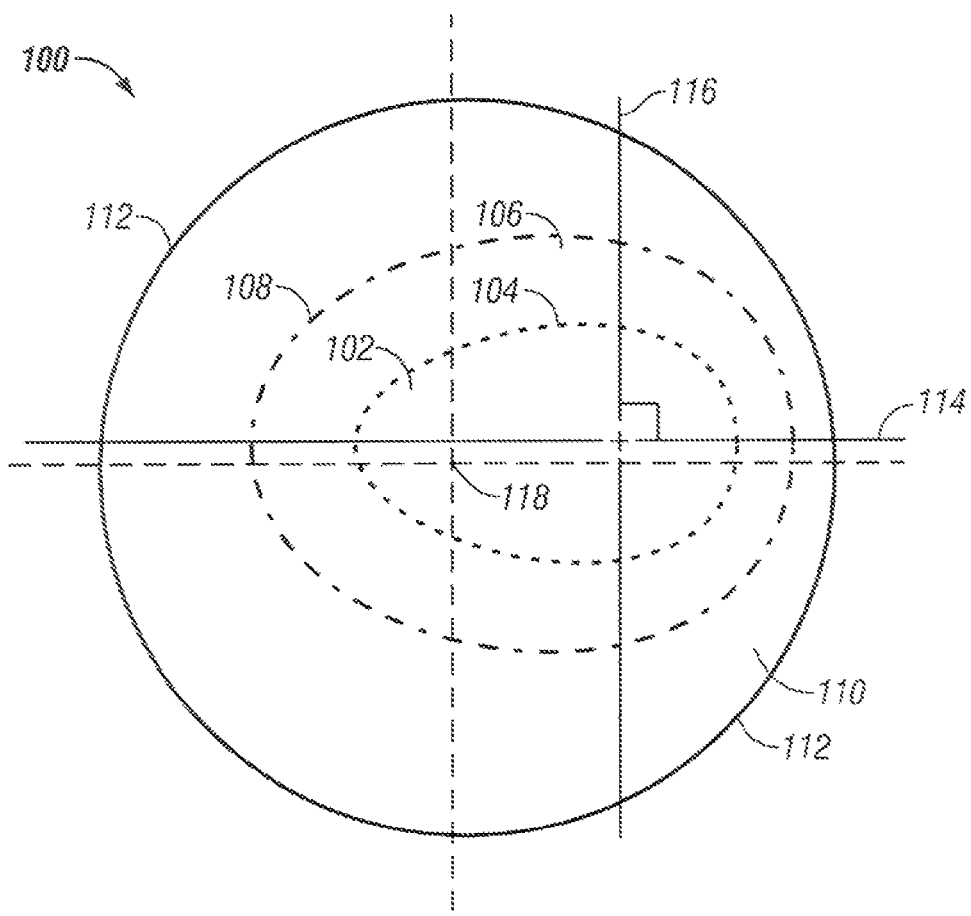
FIG. 1 is an anterior view of a contact lens for keratoconus according to an embodiment of the invention.

Referring now to the figures, which are illustrative of multiple embodiments of the present invention only and are not for purposes of limiting the same, FIG. 1 depicts a contact lens 100 for keratoconus in accordance with one embodiment of the present invention. The keratoconus contact lens 100 of the invention has a displaced central zone 102 that is offset from the geometric center 118 of the lens 100. The curvature of the central zone 102 is substantially oval in shape in that it resembles the curvature of a spoon or a hen's egg, and the perimeter 104 of the central zone 102 also takes the shape of a spoon or a hen's egg in the plane of the lens 100. The perimeter 104 of the lens 100 also forms a junction between the central zone 102 and an intermediate transitional zone 106.

With further reference to FIG. 1, the displaced central zone 102 is rotationally asymmetrical with a first meridian 114 having a semi-meridian that is shorter in radius (or lower in eccentricity) than the corresponding semi-meridian of a second meridian 116. The two semi-meridians are 90 degrees apart and may be equal or unequal to each other in eccentricity. Additionally, these semi-meridians may have radii that are longer than the shortest semi-meridian.

With continued reference to FIG. 1, the central zone 102 is integral with the intermediate transitional zone 106 that terminates at a junction 108, wherein the lens 100 may be circumferentially equivalent in sagittal height or the lens 100 may have a predetermined deviation from the equivalent sagittal height. The intermediate zone 106 of the lens is integral with a peripheral zone 110 that terminates at a lens edge 112 or perimeter to form a round lens shape.

Figure 2:
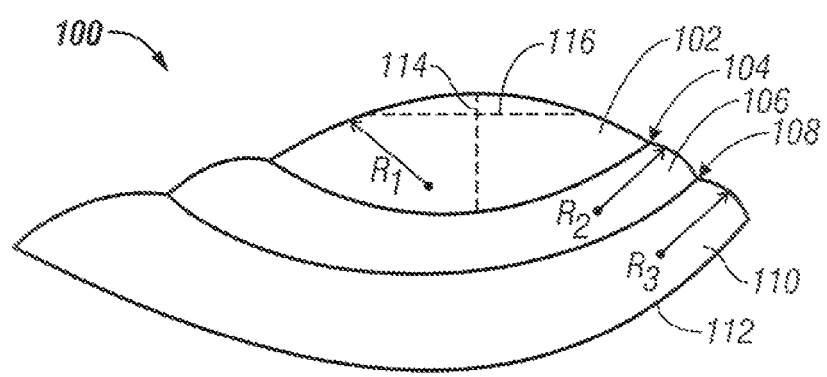
FIG. 2 is a side view of a contact lens for keratoconus according to an embodiment of the invention.

FIG. 2 illustrates a side view of the contact lens for keratoconus of FIG. 1 according to an embodiment of the invention, wherein like elements have been numbered accordingly. In the illustrated embodiment, R1 is the local radius of the middle portion of the central zone 102, R2 is the local radius of the intermediate transition zone 106, and R3 is the local radius of the peripheral zone 110.

The contact lenses described herein may be manufactured from a rigid gas permeable material or a soft lens material, such as hydrogel. As would be understood by those of ordinary skill in the art, other materials may be used to manufacture the lenses without departing from the scope of the invention. Additionally, the lenses may have a soft or flexible edge, as well as other features designed to improve comfort, and hence, wearing time of the lenses.

B. Methods of Fitting

A continuum of methods of fitting may be utilized to fit the contact lens 100 for keratoconus. Eye care practitioners are trained to use a central keratometry measurement to determine the suggested radius of curvature for rigid and soft contact lenses. This value may be used to fit an embodiment of the lens 100 of the invention, wherein the central keratometry value determines the apical radius of the lens and the anterior surface geometry is based on the known mean biometric values.

A more complex method may utilize the central keratometry value and the measured value of the horizontal visible iris diameter. These two factors assist in the determination of the sagittal height of the cornea from the cornea-sclera junction to the apex of the cornea, and also determine the location of the apex of the cornea.

Corneal topography may also be used to determine the apical radius and the average eccentricity to the widest accurate chord diameter along with the horizontal visible iris diameter. In this manner the mathematics of the central elliptical and parabolic zones of the progressive geometry may be refined. Rasterizing and Fourier methods used in topography may be useful to provide additional biometric data beyond the chord diameter of the data provided by placido based methods.

In addition, optical coherence tomography may be employed to determine the progressive geometry of the cornea, the cornea-scleral junction, the location of the apex of the cornea and the geometry of the anterior surface of the lens.

Once the posterior geometry of the lens is determined, the anterior curvature of the lens may be calculated using the posterior apical radius, the index of refraction, the known manifest refraction and the vertex distance used in the manifest refraction. Higher order aberration correction for that induced by the posterior geometry may be added to the anterior surface geometry.

C. Alternative Embodiments

An additional embodiment of the invention also provides for a kit of lenses 100 having posterior surfaces with a central zone 102 displaced from the geometric center of the lens 118, for correction of keratoconus. The series of zones contained within the lens 100 provide a range of curvatures and zone diameters and the anterior surface of the lens 100 creates lens powers respective to the posterior zone radii.

According to an embodiment of the contact lens 100 for keratoconus, the posterior curvature of the two principle meridians (that are 90 degrees apart) varies according to the local geometry in each meridian. Each meridian includes a geometry based on the apical radius of the respective meridian.

Figure 3:
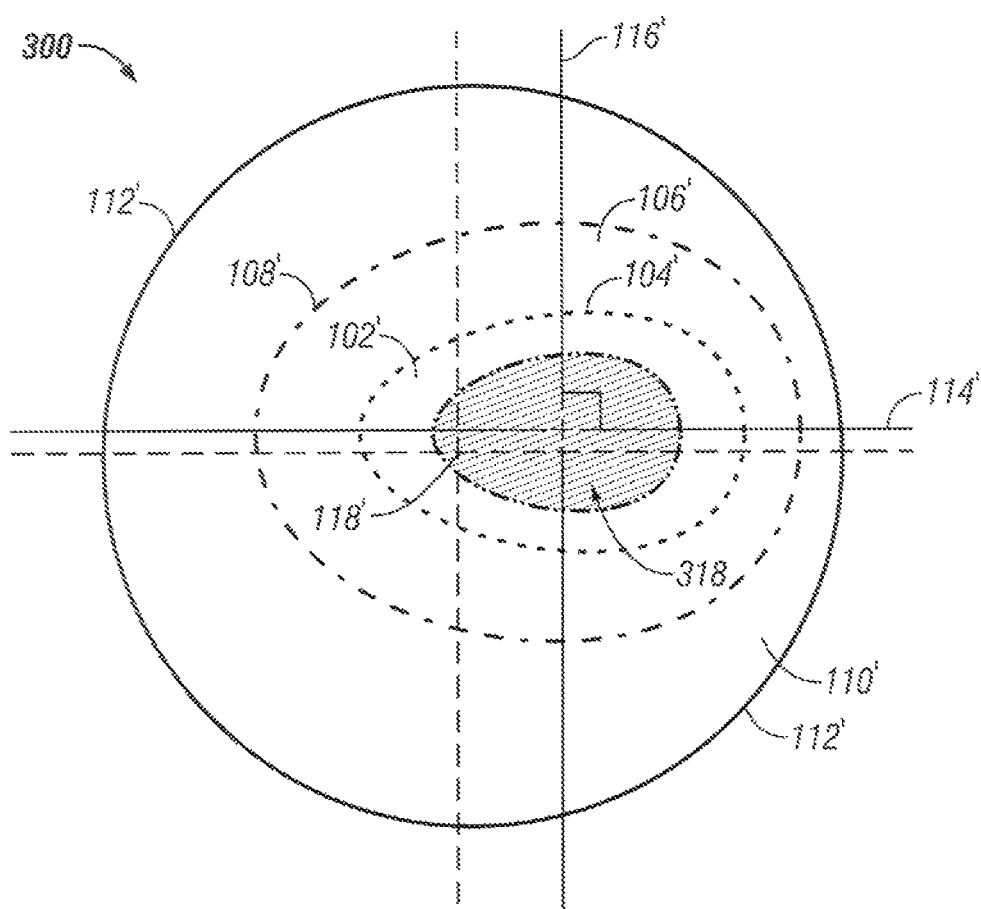
FIG. 3 is an anterior view of a contact lens for keratoconus incorporating bifocal or multifocal correction according to an embodiment of the invention.

A further embodiment of the invention is depicted in FIG. 3. Specifically, a contact lens 300 for keratoconus provides for bifocal or multifocal correction. In the illustrated embodiment, the contact lens 300 features the same back surface geometry as the single vision (non-bifocal) designs. Accordingly, the bifocal or multifocal correction is equivalent to the correction in the single vision lens of FIGS. 1 and 2. This bifocal or multifocal correction is incorporated in the anterior surface of the lens 300 or encapsulated within the lens. The correction has center and peripheral zones that are comprised of multiple spherical curvatures, or a combination of spherical and aspherical curvatures. The size of the central and peripheral zones may be determined by pupil size or any other arbitrary means, and may take into account an off-center location of the apex of the cornea. The central zone may be displaced from the geometric center of the lens to compensate for the deviation of the apex of the cornea from the center of the eye and to prevent the lens 300 from displacing toward the apex of the cornea.

With continued reference to FIG. 3, the lens 300 is similar in some regards to the lens 100 of FIGS. 1 and 2, and like elements have been labeled accordingly. Similar to previous embodiments, the lens 300 includes a central zone 102' and an intermediate zone 106' that meet at a junction 104', and a peripheral zone 110' that meets the intermediate zone 106' at a junction 108'. The geometric center 118' is offset from the central zone 102'.

With further reference to FIG. 3, the bifocal or multifocal correction is incorporated in the anterior surface of the lens 300, as shown by element 318 located in the central zone 102'. The area of correction 318 may have a center near or center distance design. Additionally, the central zone 102' and peripheral zone 110' may comprise multiple spherical curvatures, two aspherical curvatures, or a combination of aspherical and spherical curvatures. The size of the central zone 102' and peripheral zone 110' may be determined by pupil size or by arbitrary means. The central zone 102' is displaced from the geometric center 118 of the lens 300 to compensate for the deviation of the geometric center of the lens 300 from the center of the pupil or the deviation of the geometric center of the lens 300 from the line of sight.

Figure 4:
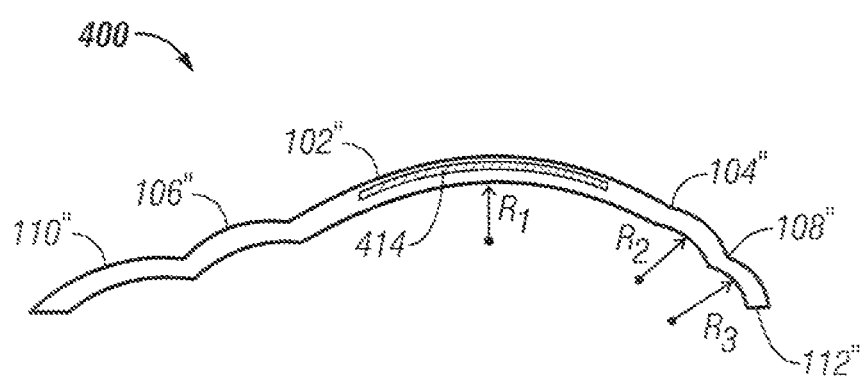
FIG. 4 is a side view of a contact lens for keratoconus incorporating embedded bifocal or multifocal correction according to an embodiment of the invention.

FIG. 4 shows a further embodiment incorporating bifocal or multifocal correction. In this embodiment, the bifocal or multifocal correction is encapsulated within the lens 400, as shown by element 414 located in the central zone 102". The area of correction may have a center near or center distance design. The central zone 102" and peripheral zone 110" may comprise multiple spherical curvatures, two aspherical curvatures, or a combination of aspherical and spherical curvatures. The size of the central zone 102" and peripheral zone 110" may be determined by pupil size or by arbitrary means. The central zone 102" incorporating the embedded bifocal or multifocal correction 414 is displaced from the geometric center of the lens 400 to compensate for the deviation of the geometric center of the lens 400 from the center of the pupil or the deviation of the geometric center of the lens 400 from the line of sight.

Figure 5:
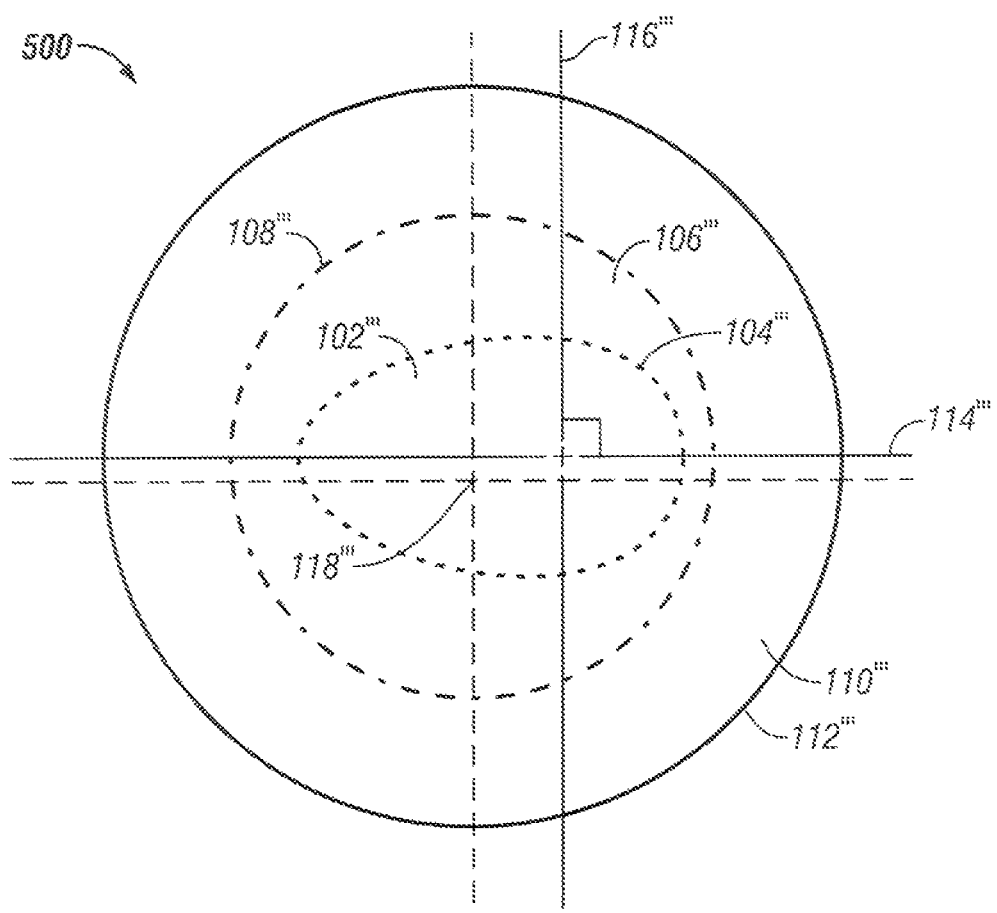
FIG. 5 is an anterior view of a contact lens for keratoconus according to an embodiment of the invention.

FIG. 5 shows a further embodiment incorporating a junction 108''' of the intermediate zone 106''' and peripheral zone 110'''. Intermediate zone 106''' contains a central zone 102''' that is asymmetrical. The intermediate zone 106''' accommodates the rotational asymmetry of the central zone 102''' to create symmetry and a circumferentially equal sagittal height at 108'''.

A still further embodiment provides for correction of higher order aberrations of the lens-eye system. The lens-eye system may have higher order aberrations that result from the aberrations of the eye, the aberrations of the lens and the aberrations from the position of the lens on the eye. The lens may induce new aberrations into the lens-eye system. One method of determining the residual lens-eye aberrations is to conduct an over-refraction test using an aberrometer. In this manner, the anterior or posterior surface of the lens may be modified to correct residual lens-eye aberrations.

The most significant aberration of the modal lens-eye system is spherical aberration. Spherical aberration may be corrected without the use of over-refraction with an aberrometer. The spherical aberration of the eye is measured by conventional means using the aberrometer, and the spherical aberration of the lens is calculated by conventional means using the apical radius and conic constant over the central zone of the posterior surface and the lens power. The anterior curvature may then be calculated to produce the desired spherical aberration of the lens-eye system. In some cases the desired amount may be zero or the lens-eye system may be best corrected with a prescribed amount of positive spherical aberration.

Thus, it is seen that contact lenses for keratoconus and methods for fitting such lenses are provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative embodiments may be implemented to achieve the desired features of the present invention. Also, a multitude of different constituent part names other than those depicted herein may be applied to the various parts of the devices. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A contact lens for keratoconus having a posterior surface facing toward an eye having at least three zones, comprising:
   a central zone displaced from the two-dimensional geometric center of the contact lens in the z direction, wherein the central zone is rotationally asymmetrical having a meridian with a first semi-meridian shorter in radius than a corresponding second semi-meridian;
   an intermediate transition zone formed integral with a periphery of the central zone; and
   a peripheral zone formed integral with a periphery of the intermediate transition zone.

2. The contact lens of claim 1, wherein the intermediate transition zone includes an initial local slope equivalent to a final local slope of the central zone in all semi-meridians.

3. The contact lens of claim 1, wherein the intermediate transition zone includes a rotational asymmetry resulting in equivalent sagittal height circumferentially at its junction with the peripheral zone.

4. The contact lens of claim 1, wherein the intermediate transition zone includes a geometry resulting in non-equivalent sagittal height circumferentially at its junction with the peripheral zone.

5. The contact lens of claim 4, wherein the peripheral zone includes a rotational asymmetry resulting in equivalent sagittal height circumferentially at an edge of the contact lens.

6. The contact lens of claim 4, wherein the intermediate transition zone includes an initial local slope equivalent to a final local slope of the central zone in all semi-meridians.

7. The contact lens of claim 1, wherein one semi-meridian of the central zone is lower in eccentricity than its corresponding semi-meridian.

8. The contact lens of claim 1, wherein the eccentricity of the semi-meridians of the central zone are substantially equivalent.

9. The contact lens of claim 1, wherein the semi-meridians of the central zone are unequal in eccentricity and have radii longer than a shortest semi-meridian.

10. The contact lens of claim 1, further comprising an anterior lens surface containing a correction for neutralizing low and higher order aberrations of a lens-eye system.

11. A contact lens for keratoconus having a posterior surface facing toward an eye having at least three zones, comprising:
   a central zone displaced from the two-dimensional geometric center of the contact lens in the z direction, wherein the central zone is rotationally asymmetrical having a meridian with a first semi-meridian with an eccentricity different than a corresponding second semi-meridian;
   an intermediate transition zone formed integral with a periphery of the central zone; and
   a peripheral zone formed integral with a periphery of the intermediate transition zone.

12. The contact lens of claim 11, wherein the intermediate transition zone includes an initial local slope equivalent to a final local slope of the central zone in all semi-meridians.

13. The contact lens of claim 11, wherein the intermediate transition zone includes a rotational asymmetry resulting in equivalent sagittal height circumferentially at its junction with the peripheral zone.

14. The contact lens of claim 11, wherein the intermediate transition zone includes a geometry resulting in non-equivalent sagittal height circumferentially at its junction with the peripheral zone.

15. The contact lens of claim 14, wherein the peripheral zone includes a rotational asymmetry resulting in equivalent sagittal height circumferentially at an edge of the contact lens.

16. The contact lens of claim 14, wherein the intermediate transition zone includes an initial local slope equivalent to a final local slope of the central zone in all semi-meridians.

17. The contact lens of claim 11, wherein one semi-meridian of the central zone is lower in eccentricity than its corresponding semi-meridian.

18. The contact lens of claim 11, wherein the eccentricity of the semi-meridians of the central zone are substantially equivalent.

19. The contact lens of claim 11, wherein the semi-meridians of the central zone are unequal in eccentricity and have radii longer than a shortest semi-meridian.

20. The contact lens of claim 11, further comprising an anterior lens surface containing a correction for neutralizing low and higher order aberrations of a lens-eye system.

\* \* \* \* \*